[54] SURVEILLANCE RADAR

[75] Inventor: Ralph L. Dunn, Neptune, N.J.

[73] Assignee: The United States of America as represented by the Secretary of the Army, Washington, D.C.

[22] Filed: Mar. 31, 1961

[21] Appl. No.: 99,964

[52] U.S. Cl. ............................ 343/5 PD; 343/100 PE
[51] Int. Cl.$^2$ ............................................ G01S 9/02
[58] Field of Search .......... 343/11 R, 16 R, 100 PE, 343/5 PD

[56] References Cited
UNITED STATES PATENTS
2,513,962  7/1950  Patterson ............................... 343/16

*Primary Examiner*—T. H. Tubbesing
*Attorney, Agent, or Firm*—Nathan Edelberg; Robert P. Gibson; Jeremiah G. Murray

EXEMPLARY CLAIM

1. In a radar apparatus having a pulsed transmitter source of linearly polarized radio-frequency energy, a duplexer, a receiver, and a directional antenna system including a rotatable dipole antenna for radiating linearly polarized radio-frequency energy, means interconnecting said duplexer and said dipole antenna for rotating said linearly polarized energy at a prescribed rate, means for rotating said dipole antenna in a vertical plane at said prescribed rate, a cathode ray tube indicator, means independent of said pulsed transmitter source and in circuit with said cathode ray tube indicator for generating a circular trace on the face of said cathode ray tube indicator, and means in circuit with said cathode ray tube indicator and responsive to the video output of said receiver for distorting the clutter pattern from natural targets along the perimeter of said circular trace when linear polarization energy is reflected from a man-made target having a defined plane of polarization.

5 Claims, 4 Drawing Figures

INVENTOR,
RALPH L. DUNN
BY
Harry M. Saragovitz

SURVEILLANCE RADAR

The invention described herein may be manufactured and used by or for the Government for governmental purposes without the payment of any royalty thereon.

The invention relates to radar systems and more particularly to a radar system in which linearly polarized signals are radiated and detected.

While circular-polarized techniques have been heretofore used to distinguish aircraft or ships from natural phenomena, such as rainstorms, such techniques have not proven satisfactory in distinguishing between man-made targets, such as trucks or tanks for example, from the surrounding ground clutter. It is known that polarization sensitivity of man-made targets may result from several factors. Among these factors is the effect of di-planes, that is, two planes of surfaces having a common line of intersection. Signals reflected from such angular surfaces give rise to a double reflection of radar energy in which the E component of the electromagnetic wave is reversed on round trip when it is perpendicular to the line of intersection. Another factor to be considered is that of resonance. An enhanced return from the polarization energy will occur when the metallic parts of man-made targets are a finite number of wavelengths of energy and are in the plane of the transmitted polarization vector.

It is an object of the present invention to provide a radar system wherein stationary man-made targets may be readily distinguishable from ground clutter by utilizing linearly polarized radio-frequency energy.

In accordance with the present invention the radar system includes a periodically pulsed transmitter adapted to generate linearly polarized energy, a deplexer and a receiver connected to function conventionally. In addition, there is included a directional antenna system provided with a rotatable dipole antenna and a linear polarization rotator interconnecting the duplexer and the dipole antenna. Also included are means for simultaneously rotating in the linear polarization of the received and transmitted radio-frequency energy and the dipole antenna at the same prescribed rate. In addition there is included a cathode ray tube indicator and means independent of the pulsed transmitter source and in circuit with the cathode ray tube indicator for generating a circular trace on the face thereof. Also included are means in circuit with the cathode ray tube indicator and responsive to the video output of the receiver such that when no man-made target is detected there is an indication of natural clutter on the cathode ray tube indicator, and when a man-made target is detected, at least two diametrically opposing outwardly extending blips are presented.

For a better understanding of the invention, together with other and further objects thereof, reference is had to the following description taken in connection with the accompanying drawing in which.

Figure 1:
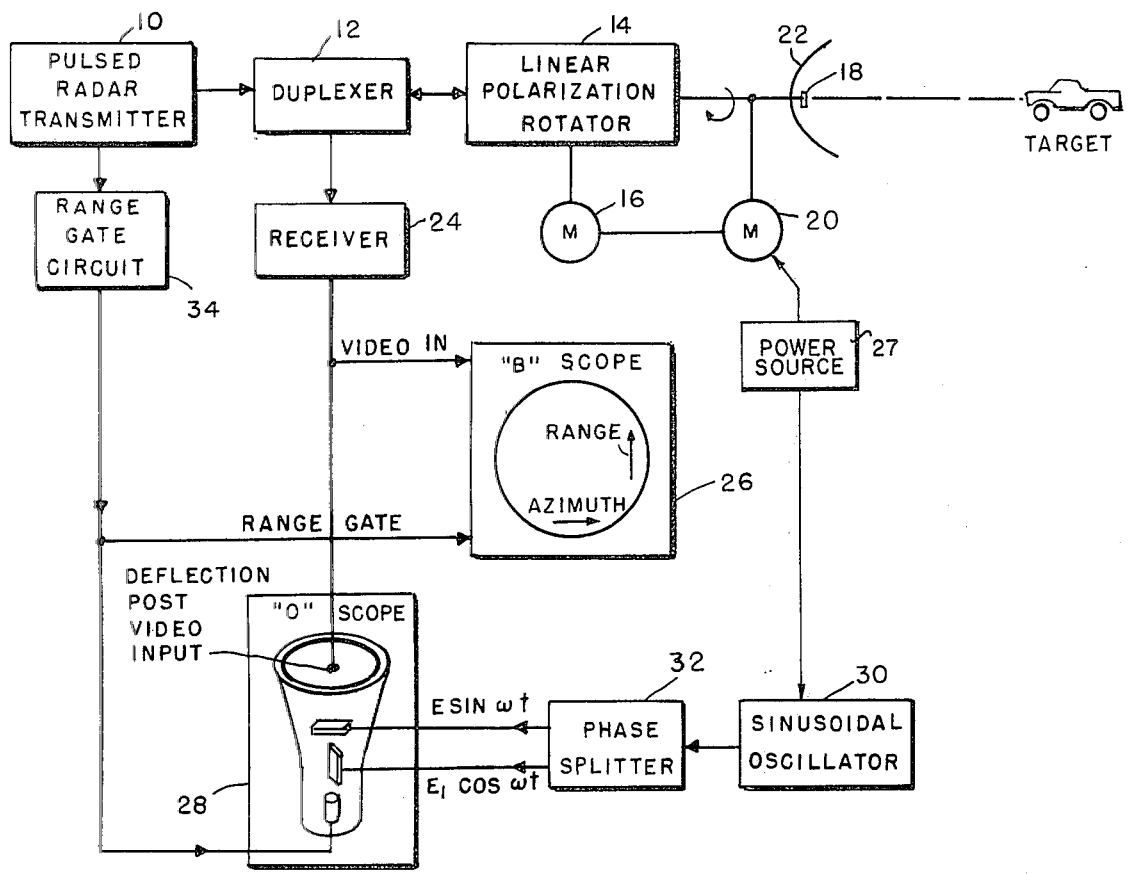
FIG. 1 is a block circuit diagram embodying the invention.
Figure 2:
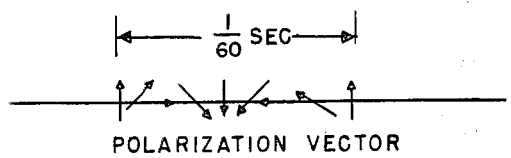
FIG. 2 illustrates the rotation of the polarization vector for one complete cycle of rotation.

Referring now to FIG. 1 of the drawing, there is shown a radar pulse transmitter 10 for producing short duration pulses of microwave energy. The microwave pulsed output of transmitter 10 is assumed to be transverse electric signals linearly polarized and applied through duplexer 12 into a polarization rotatable section 14. Rotatable section 14 consists essentially of a dielectric plate mounted in an axially rotatable section of a cylindrical waveguide and is fully described in Purcell et al. U.S. Pat. No. 2,607,849 issued Aug. 19, 1952. With such a device, the polarization vector may be rotated at twice the speed of rotation of the guide. Section 14 may be rotatably driven by means of a drive motor 16 adapted to rotate section 14 at a suitable speed, 30 r.p.s. for example. With the choice of 30 r.p.s., then the polarization vector will be rotated at 60 spins per second as shown in FIG. 2. The output of polarization rotator 14 is fed into a rotatable dipole 18 which is driven by means of motor 20 to rotate at the same speed as that of the polarization vector derived from polarization rotator 14. Directivity of the energy radiated from dipole 18 is provided by a stationary conventional parabolic reflector 22. It is to be understood, of course, that the motors 16 and 20 are driven in synchronism such that the position of rotatable dipole 18 about its axis at any instant coincides with direction of polarization of the microwave energy derived from polarization rotator 14.

Pulse echoes are picked up by antenna 18 and fed back through polarization rotator 14 to duplexer 12 and thence passed to a receiver 24 in the conventional manner. The detected video output of receiver 24 is applied to a conventional B scope 26 to indicate range and azimuth of a selected target and also to the deflection post of an "O" scope 28. "O" scope 28 is similar in construction to the well known "J" scope but differs therefrom in that the circular trace on "O" scope 28 is independent of the transmitter pulse. The circular trace on "O" scope 28 is produced in the usual manner by simultaneously applying two quadrature related sine-wave signals to respective deflection plates. As shown, the quadrature related sine-wave signals are derived from a sinusoidal oscillator 30 whose output is applied to a phase splitter 32. As is well known, the inputs to motor 20 and oscillator 30 may be derived from the same power source 27 so that the frequencies of the motor and oscillator will be properly synchronized. The output of phase splitter 32 consists of the two quadrature related sine-wave signals which are applied to the deflection plates of "O" scope 28 to produce a circular trace thereon. In order to select a prescribed target, there is provided a conventional range gate circuit 34 which is synchronized with the output of pulses derived from transmitter 10. The output of the range gate 34 is applied to the B scope 26 in the conventional manner to select a given target at a prescribed range, and also to the gun of the "O" scope 28 as a brightening gate.

Figure 3:
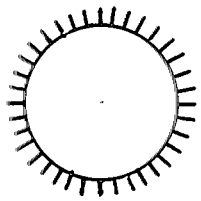
FIG. 3 illustrates the pattern on the cathode ray tube indicator for natural clutter with no man-made target detected therein.
Figure 4:
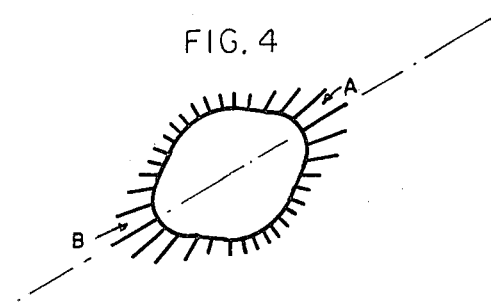
FIG. 4 illustrates the pattern on the cathode ray tube indicator when a man-made target is detected within the natural clutter.

For a better understanding of the operation of the invention reference is made to the "O" scope indications shown in FIGS. 3 and 4. In FIGS. 3 and 4, the solid line joining the radial spokes is merely a diagramatic representation of the outline of the pattern as it appears on the face of the cathode ray tube indicator. The circular trace, of course, is not affected by the received signal. FIG. 3 illustrates the "O" scope indication for only ground clutter in the form of natural obstacles with no man-made target within the clutter. As shown, this indication consists of uniform radial spokes emanating from the perimeter of the circular trace. FIG. 4 illustrates the "O" scope indication when a man-made target is detected within the clutter due to natural obstacles. The operation of the radar set determines the position of the range gate in order to bracket the desired target in range. This gate, which may cover approximately 125 yards, is applied to the electron gun of "O" scope 28 as a brightening pulse. With such an arrangement only the video within the tracking gate is presented for viewing on the "O" scope 28. As the video amplitude of the target return is applied to the deflection post of the "O" scope 28, a portion of the radial spokes becomes enlarged or distorted as shown in FIG. 4 to provide a deflection in the natural target clutter pattern. The amplitude of the target return causes a deflection farther from the center of the tube as at A. Such a distortion or deflection will hereinafter be referred to as a "blip". A greater deflection or "blip" is obtained when the transmitted polarization coincides with a plane of polarization sensitivity of the man-made target. It is to be noted that a second distortion or deflection is shown at B diametrically opposite A. This represents the same direction of polarization as at A, but 180° displaced therefrom. While only two "blips" as shown in FIG. 4, it is to be understood that four such blips may also be present if the man-made target is sensitive to two planes of polarization which intersect at an angle. By noting the differences hereinabove described in the "O" scope 28, an operator may readily determine when a man-made target is present within clutter due to natural obstacles.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a radar apparatus having a pulsed transmitter source of linearly polarized radio-frequency energy, a duplexer, a receiver, and a directional antenna system including a rotatable dipole antenna for radiating linearly polarized radio-frequency energy, means interconnecting said duplexer and said dipole antenna for rotating said linearly polarized energy at a prescribed rate, means for rotating said dipole antenna in a vertical plane at said prescribed rate, a cathode ray tube indicator, means independent of said pulsed transmitter source and in circuit with said cathode ray tube indicator for generating a circular trace on the face of said cathode ray tube indicator, and means in circuit with said cathode ray tube indicator and responsive to the video output of said receiver for distorting the clutter pattern from natural targets along the perimeter of said circular trace when linear polarization energy is reflected from a man-made target having a defined plane of polarization.

2. The system in accordance with claim 1 and further including means responsive to the pulsed output of said transmitter and in circuit with said cathode ray tube indicator for selectively gating said cathode ray tube indicator to indicate a selected man-made target.

3. The system in accordance with claim 1 wherein said last mentioned means comprises a deflection post centrally positioned on the face of said cathode ray tube indicator, and wherein at least two diametrically opposed deflections in the natural clutter pattern are indicated when linear polarized energy is reflected from a man-made target and detected by said receiver.

4. A radar system for detecting man-made targets within ground clutter due to natural obstacles comprising, a source of periodically pulsed linearly polarized radio-frequency energy, a directional antenna system including a rotatable dipole antenna, a duplexer responsive to the output of said radar transmitter, a radar receiver responsive to the output of said duplexer when a target echo is received, a linear polarization rotator interconnecting said duplexer and said rotatable dipole antenna, means for simultaneously rotating the linear polarization of the received and transmitted radio-frequency energy and said dipole antenna at the same rate, a cathode ray tube indicator, means independent of said pulsed transmitter source and in circuit with said cathode ray tube indicator for generating a circular trace on the face of said cathode ray tube indicator, and means in circuit with said cathode ray tube indicator and responsive to the video output of said receiver such that when no man-made target having a defined plane of polarization is detected there is a natural clutter pattern indicated along the periphery of saiid circular trace, and when a man-made target is detected at least two diametrically opposing outwardly extending blips are presented in said natural clutter patern.

5. The system in accordance with claim 4 and further including means responsive to the output of said pulsed radio-frequency energy source and in circuit with said cathode ray tube indicator for selectively gating said cathode ray tube indicator to indicate a selected man-made target.

* * * * *